(12) United States Patent
Blanford

(10) Patent No.: US 7,055,976 B2
(45) Date of Patent: Jun. 6, 2006

(54) COLLAPSIBLE TABLETOP LIGHTING APPARATUS

(76) Inventor: Thomas Charles Blanford, 396 Amador Ave., Ventura, CA (US) 93004

( * ) Notice: Subject to any disclaimer, the term of this patent is extended or adjusted under 35 U.S.C. 154(b) by 32 days.

(21) Appl. No.: 10/833,692

(22) Filed: Apr. 28, 2004

(65) Prior Publication Data
US 2005/0243538 A1    Nov. 3, 2005

(51) Int. Cl.
*G03B 15/02* (2006.01)
(52) U.S. Cl. .......................... 362/16; 229/103
(58) Field of Classification Search ............... 362/16; 229/103; 206/736, 745, 756, 573; 312/257.1, 312/258, 259
See application file for complete search history.

(56) References Cited

U.S. PATENT DOCUMENTS

| 384,151 | A | | 6/1888 | Gould |
|---|---|---|---|---|
| 523,323 | A | | 7/1894 | Clinedinst, Jr. |
| 3,643,085 | A | | 2/1972 | Durand |
| 3,806,219 | A | * | 4/1974 | Ahmann ..................... 312/265 |
| 4,292,662 | A | | 9/1981 | Gasperini |
| 5,664,232 | A | | 9/1997 | Goto |
| 5,778,258 | A | | 7/1998 | Zamoyski |
| 6,106,124 | A | | 8/2000 | Tarsia |
| 6,659,620 | B1 | | 12/2003 | Goto |
| 6,672,737 | B1 | | 1/2004 | Lai et al. |

* cited by examiner

*Primary Examiner*—Renee Luebke
*Assistant Examiner*—Leah S. Lovell
(74) *Attorney, Agent, or Firm*—J. E. McTaggart

(57) ABSTRACT

A collapsible tabletop lighting apparatus consisting of a box-like structure for photographing 3D subjects in an evenly illuminated environment. The interior of the box-like structure is evenly illuminated by an integrated use of a detachable single fluorescent lighting unit, a single light diffuser panel, and a plurality of reflective interior surfaces. For storage or transporting of the apparatus, the single fluorescent lighting unit easily detaches from the said structure and is stored on the said structures floor while the lid and side panels of the said structure fold inward, on top of each other to form a closed, secured compact box.

19 Claims, 5 Drawing Sheets

US 7,055,976 B2

COLLAPSIBLE TABLETOP LIGHTING APPARATUS

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of the Invention

The present invention relates to a collapsible tabletop lighting studio for photographing 3 dimensional objects with a digital camera.

2. Background of the Invention

Digital photography—image capture, and image-editing using the latest digital consumer cameras and inexpensive photo editing software on personal computers—is becoming quite popular and commonplace with the general public. Today, an individual or small business owner using consumer available digital imaging technology has the capability to produce high quality photographs of products or 3D objects without the expense or need of a professional photographer. This technology—digital cameras and image-editing software—has changed the need to get the final image "right" in front of the camera. To get that desired look, touchups or enhancements of the digital image can now be done later in the computer. Because of this image-editing capability, the primary function of the digital based studio is to provide lighting that improves the extent to which final changes can be made with the software. To satisfy that function a studio lighting environment needs to be evenly illuminated to reveals surface detail, shape, form, and color.

Prior art for digital tabletop studios have been generally based on, or influenced by traditional film photography techniques and the limitations of darkroom editing. Design emphasis of the prior art, in most cases, has not been focused toward the consumer market—use of low cost construction materials, simple setup, simplicity of use, and easily storable for occasional use. Instead, the prior art was been designed toward the traditional needs in product or 3D object photography—use of durable more expensive construction materials permanent erected structures, multiple directional lighting configurations, unnecessary extra features and the emphasis on getting the final image "right" in front of the camera.

Examples of prior art that are designed with multiple directional lighting configurations are: U.S. Pat. No. 4,292,662 (1981) to Gasperini, U.S. Pat. No. 6,659,620 (2003) to Goto, and U.S. Pat. No. 6,672,737 (2004) to Lai, et al. These designs add additional construction material needs and or structure complexity to these inventions which would cause increased manufacture costs that would be passed on to the consumer.

U.S. Pat. No. 4,292,662 (1981) to Gasperini, U.S. Pat. No. 6,106,124 (2000) to Tarsia, and U.S. Pat. No. 6,672,737 (2004) to Lai, et al are designed as permanent structures and would be impractical to disassemble for storage and reassemble for occasional use.

The following U.S. Pat. No. 6,106,124 (2000) to Tarsia and U.S. Pat. No. 6,659,620 (2003) to Goto have either extra elements for cooling the vicinity of the subject to be photographed or internal power supplies for the connected multiple lighting units. Both of these elements would cause an increase to their construction and material cost.

SUMMARY OF THE INVENTION

The overall objective of this invention is to provide to the consumer market a low-cost collapsible, tabletop lighting studio that would provide even illumination of a 3D subject for photographing with a digital camera. An apparatus that would use a single fluorescent lighting unit, a single light diffuser panel and a plurality of reflective surfaces so as to create an evenly illuminated environment that reveals a 3D subject's surface detail, shape, form, and color. An apparatus with a box-like structure designed to be both easy to set-up for use and easy to collapse for storage. An apparatus that would be self-contained and also simple to use by the average consumer. An apparatus, when collapsed, would be able to store all of its elements within the structure. An apparatus that is designed to keep manufacturing cost down by using a minimal amount of elements and utilizing cost-effective materials.

DESCRIPTION OF THE PREFERRED EMBODIMENT

Figure 1:
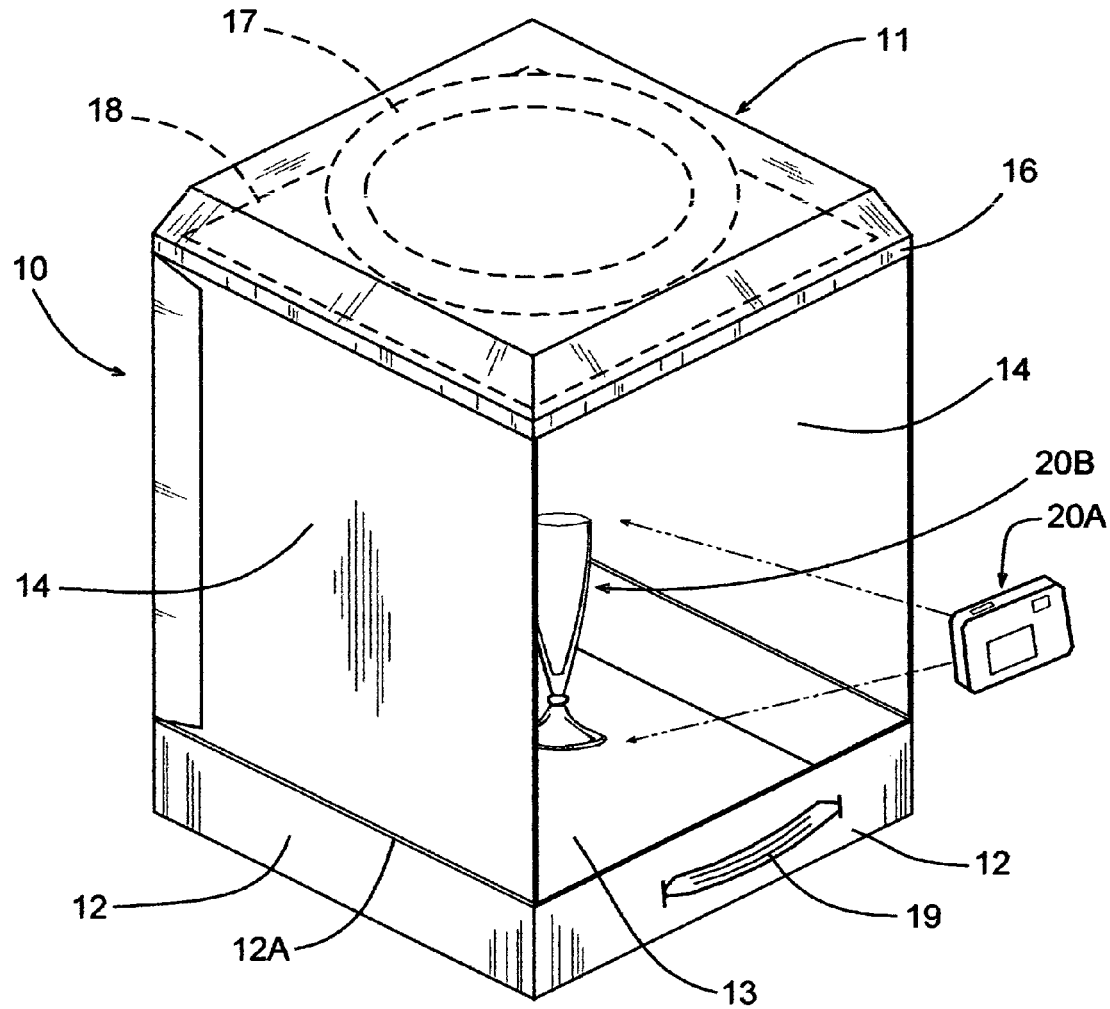
FIG. 1 is a perspective view of the collapsible tabletop lighting apparatus in the open operating position according to the preferred embodiment of the present invention. This view also illustrates how a 3D object would be placed in the apparatus to be photographed, and where the digital camera would be positioned to capture the image.

FIG. 1 illustrates the preferred embodiment of the present invention in the open operating position, comprising of the box-like structure 10 and the single lighting unit 11. The lighting unit 11 contains a fluorescent circular tube 17, and the light diffuser panel 18. The housing of the lighting unit 11 would be molded from strong light weight plastic and would be designed so the bottom edges of its side walls 16 would interlock with the upper edges of the lid 15 (show on FIG. 2) and side panels 14 of the box-like structure 10. The light diffuser panel 18 would connect to the bottom opening of the lighting units housing and would be of a material so as to evenly diffuse the light from the fluorescent tube 17 down on to the subject 20B to be photographed.

The box-like structure 10 is comprised of a floor 13, four fixed side walls 12, lid panel 15 (shown on FIG. 2), two side panels 14, and a carrying handle 19. The four fixed side walls 12 are attached to the floor 13 and also attached to their adjoining fixed side walls to form an open box-like compartment. The lid 15(shown on FIG. 2) and side panels 14 are hingedly connected 12A to their adjacent fixed side walls 12. The interior of the inside surfaces of the said structure are coated so to efficiently reflect the light from the fluorescent tube back on to the subject being photographed. The floor 13 of the said structure is used to support the photographed subject 20B while a digital camera 20A is held outside and pointed toward the said structures interior and the subject 20B. The material used for the box-like Structure's floor 13, walls 12, lid 15 (shown on FIG. 2) and side panels 14 could consist of either a ridged heavy duty corrugated cardboard, corrugated plastic, or molded plastic.

Figure 2:
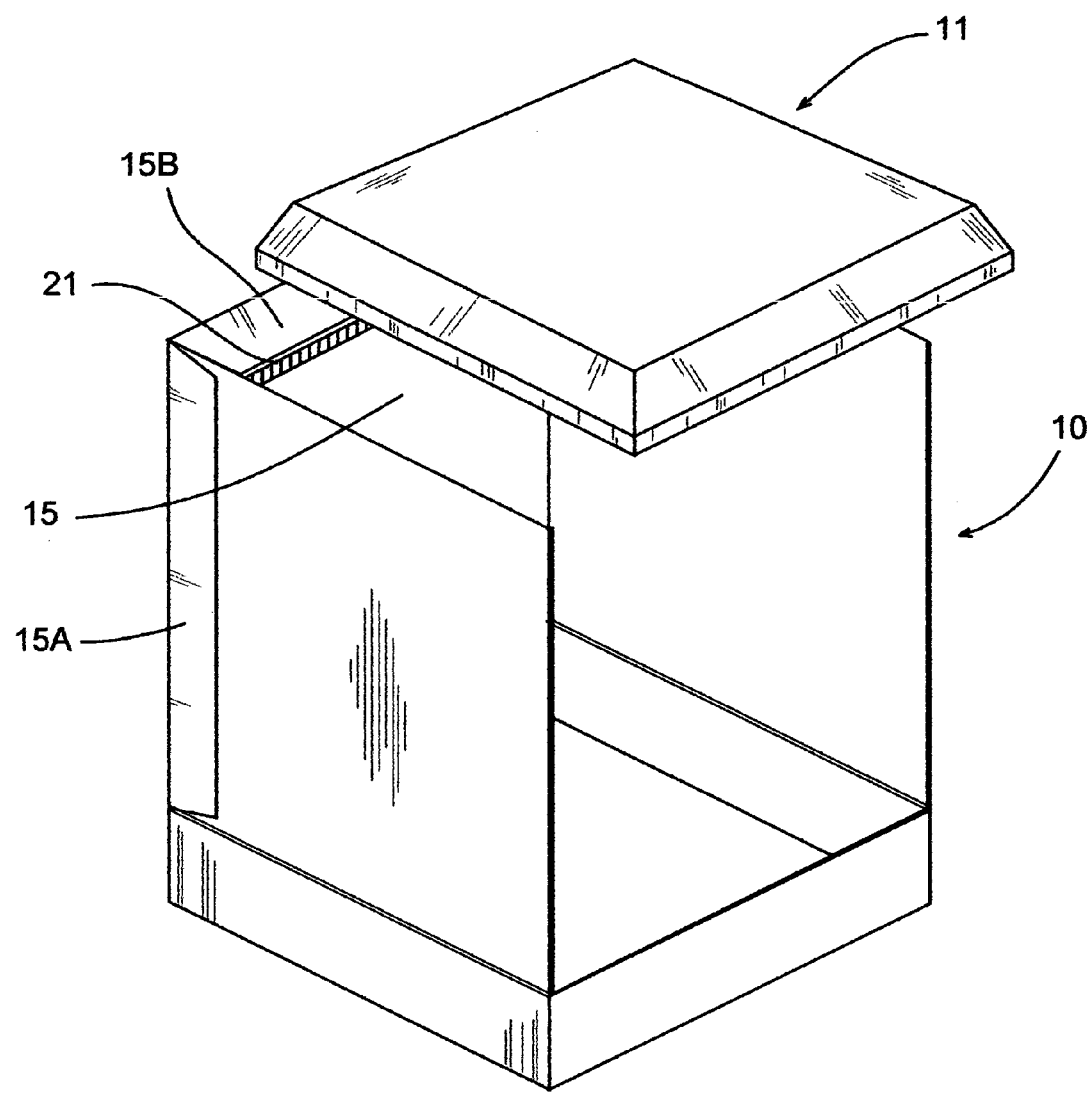
FIG. 2 is a perspective view of the collapsible tabletop lighting apparatus showing the single fluorescent lighting unit detached and lifted from the box-like structure.

FIG. 2 shows a view of the lid panel 15 with its side flap 15A and its front flap 15B. The lid panel 15 includes a fastening mechanism 21 which is connected to the upper interior section of the said panel 15. The said mechanism 21 is to hold and secure a photographic backdrop material.

Figure 3:
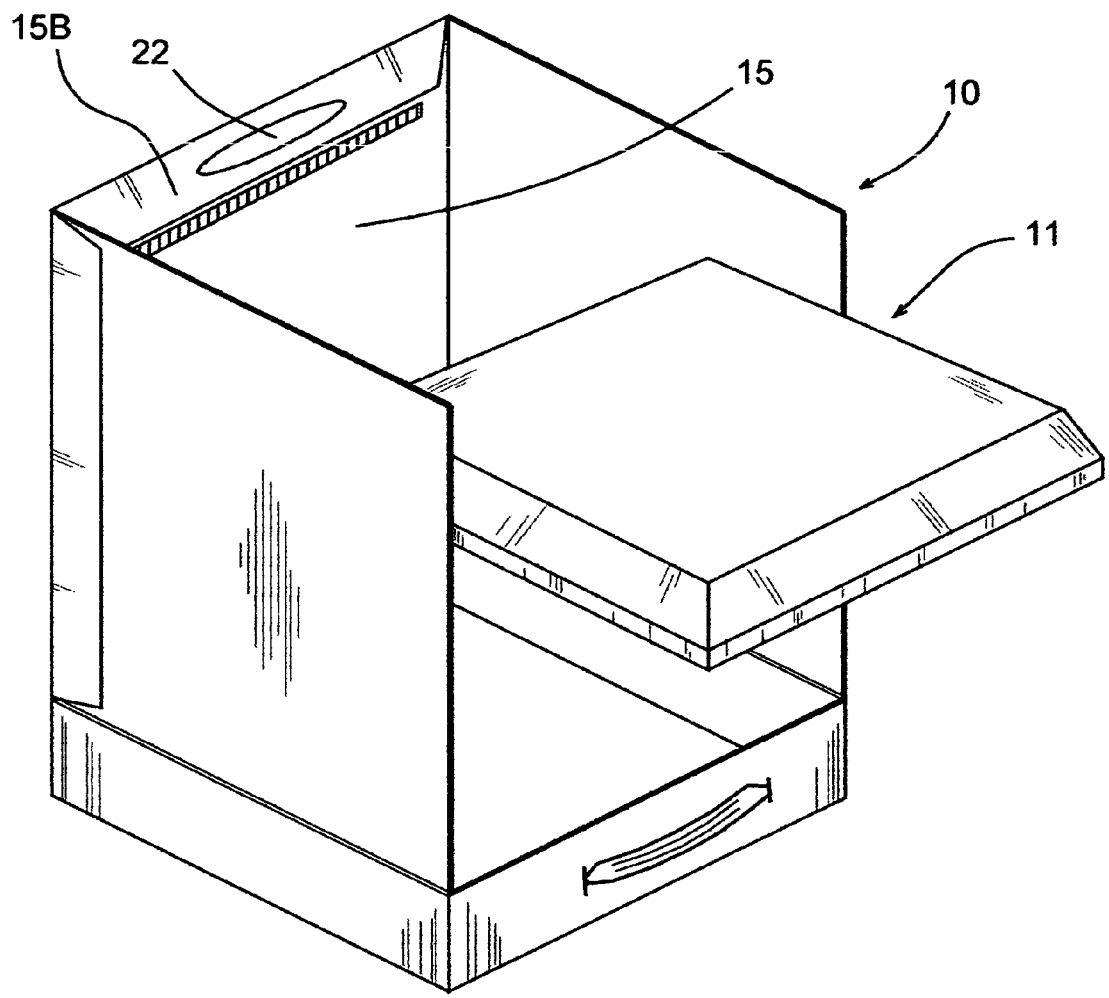
FIG. 3 is a perspective view of the collapsible tabletop lighting apparatus showing how the said lighting unit is moved in to the box-like structure to be stored.

FIG. 3 shows the lid panel's 15 front flap 15B, and carrying handle opening 22.

Figure 4:
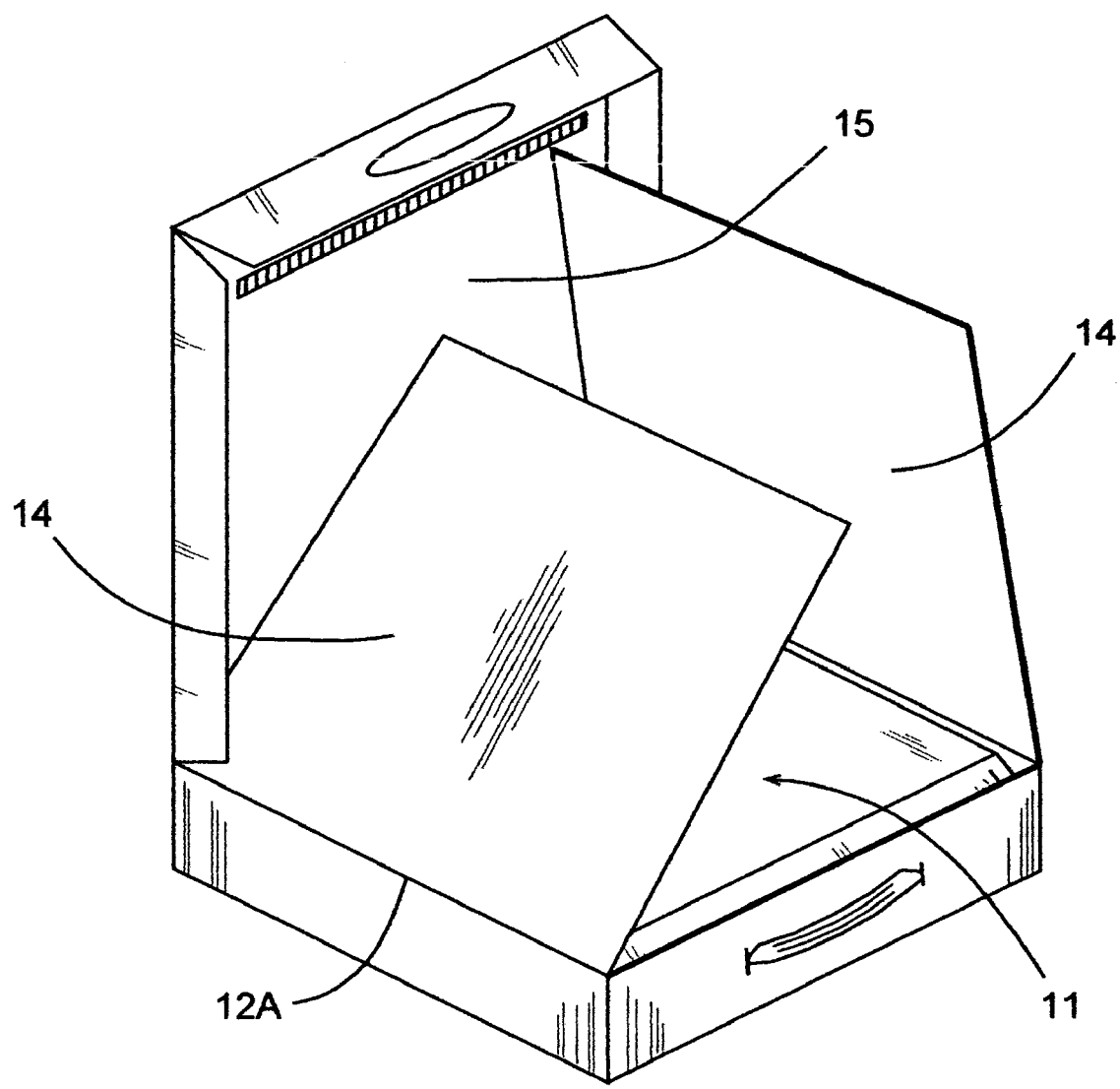
FIG. 4 is a perspective view of the table lighting apparatus showing how the main side panels fold inward and overlap each other over the base box in process of converting from the working mode to the collapsed mode.

FIG. 4 show how the side panels 14 fold inward, at the hinged connections 12A, on top of each other and on the lighting unit 11 for storage.

Figure 5:
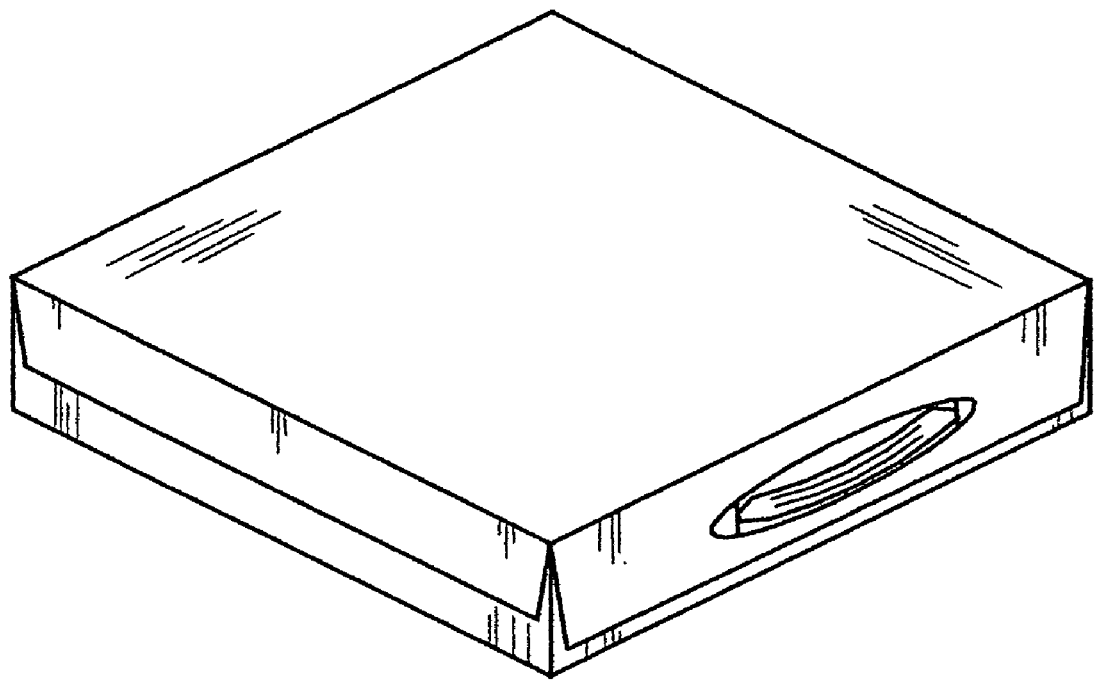
FIG. 5 is a perspective view of the subject matter of FIG. 4 after having been fully converted to the collapsed mode with the main rear panel folded down to become a lid panel of the base box.

FIG. 5 shows the present invention in the closed collapsed position for storage or transporting.

What is claimed is:

1. A collapsible light box, for uniformly lighting objects for photographic purposes, that is user-convertible between a full-sized working mode for operation as a photographic lighting enclosure and a compact collapsed mode for storage and transportation, comprising:
    a generally rectangular base box having a base rear panel, two base side panels and a base front panel, attached at four corners;
    a main rear panel made and arranged to extend upwardly from the base rear panel when the said light box is deployed in the working mode;
    a pair of main side panels made and arranged to extend upwardly from the corresponding base side panels when said light box is deployed in the working mode;
    a top cover made and arranged to fit down onto top edges of said main rear panel and said main side panels in a stable manner when said light box is deployed in the working mode; and
    a light source including means for attachment under said top cover;
    said base enclosure, said top cover and said light source being dimensioned such as to enable said top cover and said light source to fit entirely into said base box when said light box is converted to the collapsed mode;
    said main side panels being dimensioned, made and arranged such that, in converting to the collapsed mode, said main side panels can be moved to a horizontal disposition and contained entirely within said base box;
    said main rear panel being dimensioned, made and arranged such that, in converting to the collapsed mode, said main rear panel can be moved to a horizontal disposition so as to serve as a lid that fully encloses said base box for purposes of transport and storage.

2. The collapsible light box as defined in claim 1 further comprising a bottom panel attached to bottom edges of said base box.

3. The collapsible light box as defined in claim 1 wherein said main side panels are hingedly attached to corresponding upper edge regions of said base side panels.

4. The collapsible light box as defined in claim 3 wherein said main rear panel is hingedly attached along a first edge region thereof to an upper edge region of said base rear panel.

5. The collapsible light box as defined in claim 1 further comprises attachment means made and arranged to attach vertical edge regions of said main rear panel to corresponding adjacent vertical edge regions of said main side panels for stability when converting to the working mode, said attachment means being made detachable for converting to the collapsed mode.

6. The collapsible light box as defined in claim 5 wherein said attachment means comprises:
    a pair of rear corner flaps, extending one from each opposite edge of said main rear panel, hingedly attached thereto, made and arranged to fold forward against said main side panels and thus form a pair of corners therewith; and
    a pair of attachment systems made and arranged to detachably attach interfacing regions of said rear corner flaps to said main side panels.

7. The collapsible light box as defined in claim 6 further comprising a carrying handle affixed to the base front panel.

8. The collapsible light box as defined in claim 7 further comprising a closure flap extending in a hinged manner from a second edge region thereof opposite the first edge region, configured with a handle clearance opening made and arranged to allow said closure flap to interface the base front panel with said carrying handle extending through the clearance opening and exposed for carrying purposes.

9. The collapsible light box as defined in claim 8, wherein all said panels and flaps thereof are originally fabricated from a single flat piece of panel material, cut to a required outline and folded as required on fold lines to provide fixed corners and living hinges as required at attachment locations.

10. The collapsible light box as defined in claim 9, wherein the panel material is twin-wall internally-fluted plastic material.

11. The collapsible light box as defined in claim 10, wherein the rear corner flaps of said main rear panel are attached to interfacing regions of said main side panel with fasteners selected from a group of known fasteners including: Velcro, hook and loop, interacting articles, rectangular fasteners, pyramid/arrow shaped fasteners, and snaps.

12. The collapsible light box as defined in claim 1 further comprising diffusing means for uniformly illuminating the object to be photographed in a manner to avoid shadows.

13. The collapsible light box as defined in claim 12 wherein said diffusing means comprises a translucent diffusing panel attached to said top cover in an underside parallel location so as to substantially enclose said light source there-between and thus provide uniformly diffused lighting onto the object to be photographed.

14. The collapsible light box as defined in claim 13, wherein said diffusing means further comprises a flexible diffusive-reflective photographic backdrop sheet attached to an upper region of said main rear panel, suspended to hang downwardly and extend forward to a region of said base front panel thus forming a generally L-shaped profile for providing uniformly distributed diffused illumination for photographing.

15. The collapsible light box as defined in claim 1, wherein said top cover is molded from plastic, with a handle molded into the center thereof to facilitate conversion between the working mode and the collapsed mode.

16. A collapsible light box, for uniformly lighting objects for photographic purposes, that is user-convertible between a full-sized working mode for operation as a photographic lighting enclosure and a compact collapsed mode for storage and transportation, comprising:

a base box having a bottom panel, a base rear panel, two base side panels and a base front panel, attached together so as to form an open-top box:

a pair of main side panels made and arranged to extend upwardly from the corresponding base side panels when said light box is deployed in the working mode:

a main rear panel, made and arranged to extend upwardly from the base rear panel when the said light box is deployed in the working mode, configured with a pair of rear corner flaps, extending one from each opposite edge of said main rear panel, hingedly attached thereto, made and arranged to fold forward and interface said main side panels and thus form a pair of corners therewith;

detachable attachment means for providing attachment between interfacing regions of said rear corner flaps and said main side panels for structural stability in the working mode, made user detachable for conversion to the collapsed mode;

a top cover made and arranged to fit down onto top edges of said main rear panel and said main side panels in a stable manner when said light box is deployed in the working mode;

a photographic light source and associated light diffuser panel attached under said top cover;

a reflective diffusive backdrop, attached to an upper region of said rear panel and extending therefrom in a suspended L-shape to said base front panel, made white in color with photographically uniform matte surface providing diffusion and spreading of light from said lighting element for evenly illuminating the object being photographed;

said base enclosure, said top cover and said light source being dimensioned such as to enable said top cover and said light source to fit entirely into said base box when said light box is converted to the collapsed mode;

said main side panels being dimensioned such that, in converting to the collapsed mode, said main side panels can be moved to a horizontal disposition, one on the other, and contained entirely within said base box; and said main rear panel being dimensioned, made and arranged such that, in converting to the collapsed mode, said main rear panel can be moved to a horizontal disposition so as to serve as a lid that fully encloses said base box for purposes of transport and storage.

17. A method of making a photographic light box, of designated working height, to be collapsible to less than one fourth of the working height for storage and transportation purposes, comprising:

forming a base box as a portion of the light box having a height less than one fourth of the working height and having a front panel, two side panels and a rear panel;

forming a pair of main side panels extending upwardly from the base side panels, made and arranged to fold down and become contained in said base box;

forming a main rear panel, extending upwardly from the base rear panel, hingedly attached thereto, made and arranged to fold down and become a lid to said box in the collapsed mode; and providing a cover, including a diffused light source, made and arranged to rest in a stable manner on top edges of the main rear panel and the main side panels, when in the working mode, and to be stored within the base box when in the collapsed mode.

18. A method of converting a photographic light box, having a lower base box portion, from a full-size working mode with a designated full-size working height to a compact collapsed mode with a height less than one-fourth the full-size working height for purposes of storage and transportation, comprising the steps of:

removing a removable cover containing a light source and diffusion panel;

detaching a main rear panel from two main side panels via detachable fastenings provided;

placing the cover down into the base box portion, which is configured with a base front panel, a base rear panel, and a pair of base side panels, the base box portion being made, arranged and dimensioned to contain the cover, and folding the two main side panels down, one on the other, to a top region of said base box via hinge means provided attaching a bottom edge of each main side panel to a corresponding top edge of each base side panel; and folding the main rear panel down via hinge means provided attaching a bottom edge of the main rear panel to a top edge of the base rear panel, so as to form a lid on the base box portion.

19. The method of converting a photographic light box to a collapsed mode as defined in claim 18 further comprising the additional step of:

folding down a closure flap, provided hingedly attached to a front edge of the lid formed by the main rear panel, made and arranged to interface the base front panel in the collapsed mode in a manner to leave exposed a carrying handle, affixed to a central region of the base front panel and extending through an opening configured in a central region of the closure flap.

* * * * *